United States Patent [19]

Nagashima

[11] 4,413,861
[45] Nov. 8, 1983

[54] FLUID PRESSURE CONTROL VALVE UNIT OF THE INERTIA-CONTROLLED TYPE

[75] Inventor: Takashi Nagashima, Toyota, Japan

[73] Assignee: Aisin Seiki Kabushiki Kaisha, Kariya, Japan

[21] Appl. No.: 379,730

[22] Filed: May 19, 1982

[30] Foreign Application Priority Data

May 25, 1981 [JP] Japan .................................. 56-78852
Jul. 13, 1981 [JP] Japan .......................... 56-103556[U]

[51] Int. Cl.³ ........................ B60T 8/14; B60T 13/06
[52] U.S. Cl. .................................... 303/6 C; 188/349; 303/24 C; 303/24 F
[58] Field of Search ................. 303/24 C, 24 F, 24 A, 303/24 R, 6 C, 6 A, 84 A, 84 R, 22 R, 22 A; 188/349, 195

[56] References Cited

U.S. PATENT DOCUMENTS 3,825,303 7/1974 Yabuta ................................ 303/6 C
4,070,067 1/1978 Katoh et al. ....................... 303/6 C
4,284,307 8/1981 Kubota et al. ..................... 303/6 C

*Primary Examiner*—Douglas C. Butler

*Attorney, Agent, or Firm*—Oblon, Fisher, Spivak, McClelland & Maier

[57] ABSTRACT

In a fluid pressure control valve unit, a pair of first and second partition members are assembled within a housing to subdivide the interior of the housing into first and second chambers and to provide a space between the partition members. The first chamber is in open communication with an outlet port for connection to rear wheel brake cylinders, and the second chamber is in open communication with an inlet port for connection to a master cylinder. Assembled within the first chamber are a stepped piston and a control valve assembly cooperable with the piston. The piston extends through the first partition member into the space, and a control plunger is slidably disposed within an axial bore of the second partition member to provide a third chamber opening toward the second chamber. An inertia-control valve assembly is disposed within the second chamber to control the pressure in the third chamber in accordance with the rate of deceleration. In such arrangement, one of the partition members is provided at its peripheral portion with a fluid communication passage between the first and second chambers.

6 Claims, 9 Drawing Figures

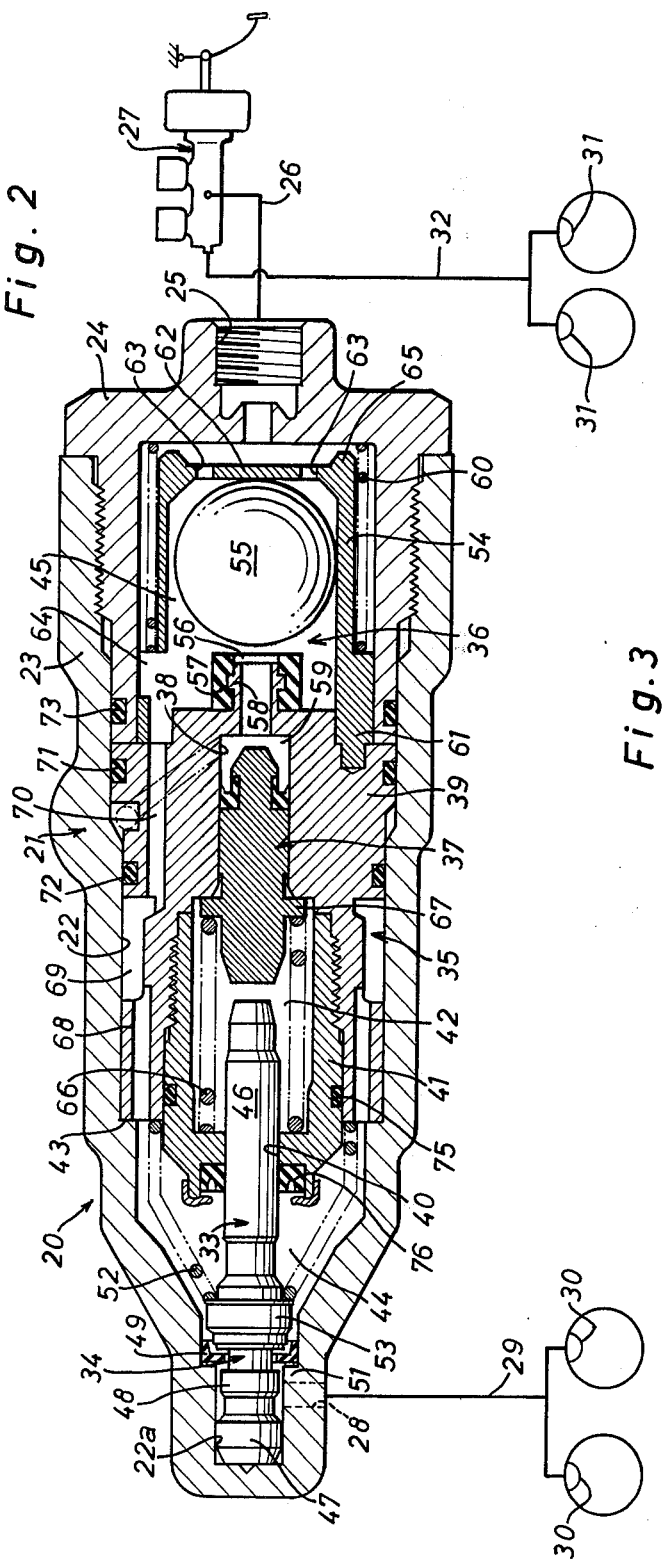

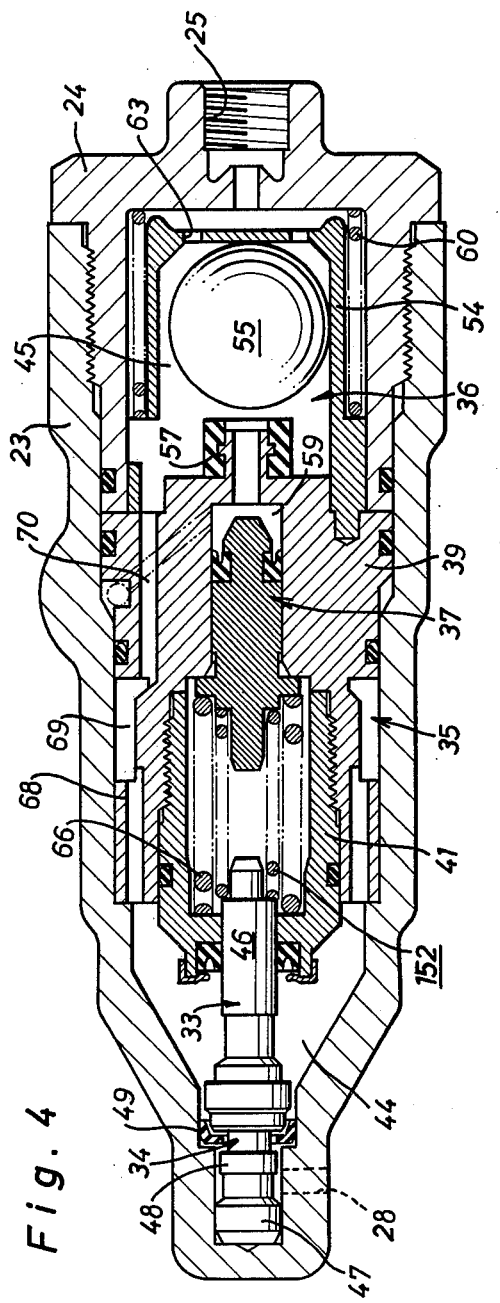
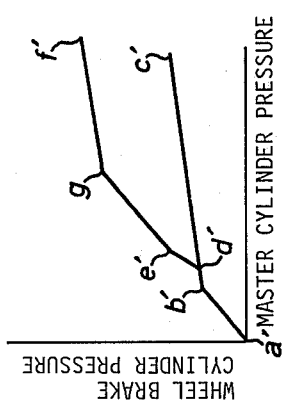
Fig. 4
Fig. 5

FLUID PRESSURE CONTROL VALVE UNIT OF THE INERTIA-CONTROLLED TYPE

BACKGROUND OF THE INVENTION

The present invention relates to a fluid pressure control device for a vehicle braking system, and more particularly to a fluid pressure control valve unit of the inertia-controlled type which is adapted to control the braking pressure applied to rear wheel brake cylinders from a master cylinder in accordance with the rate of deceleration of the vehicle.

In FIG. 1 there is illustrated one of such conventional control valve units as described above, in which a housing assembly 5 is provided with an inlet port 2 in connection to a tandem master cylinder 1 and an outlet port 4 in connection to rear wheel brake cylinders 3. Assembled within a single bore 6 of housing assembly 5 are a spring loaded stepped piston 7, an inertia-controlled valve assembly 10 including an inertia-controlled ball 9, and a spring loaded control plunger 11 for control of the piston 7. Furthermore, a pair of partition members 13 and 14 are assembled within the single bore 6 of housing assembly 5 in such a way to provide a space 12 between partition members 13, 14 and to subdivide the interior of housing assembly 5 into first and second chambers 15 and 16. Thus, one end portion of stepped piston 7 extends into the space 12 and is slidably supported from the partition member 13. The control plunger is also slidably disposed within an axial bore of partition member 14. In such arrangement, it is required to provide communication passages 17, 17 through the peripheral wall of housing assembly 5 so as to communicate the inlet port 2 to the first and second chambers 15 and 16 respectively. This results in large of the housing assembly in its size and weight.

SUMMARY OF THE INVENTION

It is, therefore, a primary object of the present invention to provide an improved fluid pressure control valve unit of the inertia-controlled type which is capable of constructing a housing assembly for the valve unit as small as possible in size and weight by provision of a fluid communication through the peripheral portion of the partition member assembly within the housing assembly.

Another object of the present invention is to provide an improved fluid pressure control valve unit of the inertia-controlled type in which pressurized fluid from the master cylinder flows across the inertia-controlled valve assembly toward the control valve to prevent an error in operation of the control plunger in emergent braking operation.

A further object of the present invention is to provide an improved fluid pressure control valve unit of the inertia-controlled type capable of eliminating unpleasant noises caused by abutment of the stepped piston and the control plunger.

According to the present invention there is provided a fluid pressure control valve unit for incorporation between a master cylinder and a wheel brake cylinder in a vehicle braking system, which comprises a housing adapted to be fixedly mounted at inclined angle on a vehicle body structure, the housing being provided at opposite ends thereof with an inlet port for connection to the master cylinder and an outlet port for connection to the wheel brake cylinder and provided therein with a stepped bore in open communication with the outlet port, a first partition member secured in position within the housing to provide first and second chambers respectively in open communication with the outlet and inlet ports, and a second partition member fixedly coupled in a fluid-tight manner with the first partition member to provide a space between the partition members.

In such an arrangement as described above, the control valve unit includes a stepped piston slidably disposed within the stepped bore of the housing in the first chamber and extending at one end thereof through the second partition member into the space, a control valve assembly cooperable with the stepped piston for controlling intercommunication between the first chamber and the outlet port in dependence upon axial movement of the piston, a first spring for biasing the piston in the direction toward a position in which the control valve assembly is opened to permit fluid flow between the first chamber and the outlet port, a control plunger slidably disposed within an axial bore of the first partition member to provide a third chamber in open communication with the second chamber, the plunger being arranged to be brought into abutment at its one end with the extending end of the piston, an inertia-controlled valve assembly disposed within the second chamber for normally permitting fluid flow between the second and third chambers but adapted to cut-off the fluid communication when subjected to a deceleration in excess of a predetermined value, and a second spring disposed within the space for biasing the control plunger toward the third chamber. Thus, the control valve unit is characterized in that the inlet and outlet ports are arranged at the opposite ends of the housing and that the first partition member is formed at its peripheral portion with a communication passage for providing a fluid communication between the first and second chambers. In the actual practices, it is preferable that a cushioning member of elastic material is secured to one of the confronting ends of the stepped piston and the control plunger and arranged to be brought into abutment with the other of the confronting ends of the stepped piston and the control plunger.

BRIEF DESCRIPTION OF THE DRAWINGS

Additional objects and advantages of the present invention will be more readily apparent from the following detailed description of preferred embodiments thereof when taken together with the accompanying drawings in which:

FIG. 2 is a schematic illustration of a vehicle braking system including a fluid pressure control valve unit of the inertia-controlled type in accordance with the present invention;

FIG. 3 is a graph showing the pressure controlling characteristics of the valve unit of FIG. 2;

FIG. 4 illustrates a modification of the valve unit shown in FIG. 2;

FIG. 5 is a graph showing the pressure controlling characteristics of the modification;

DETAILED DESCRIPTION OF THE PREFERRED EMBODIMENTS

Figure 1:
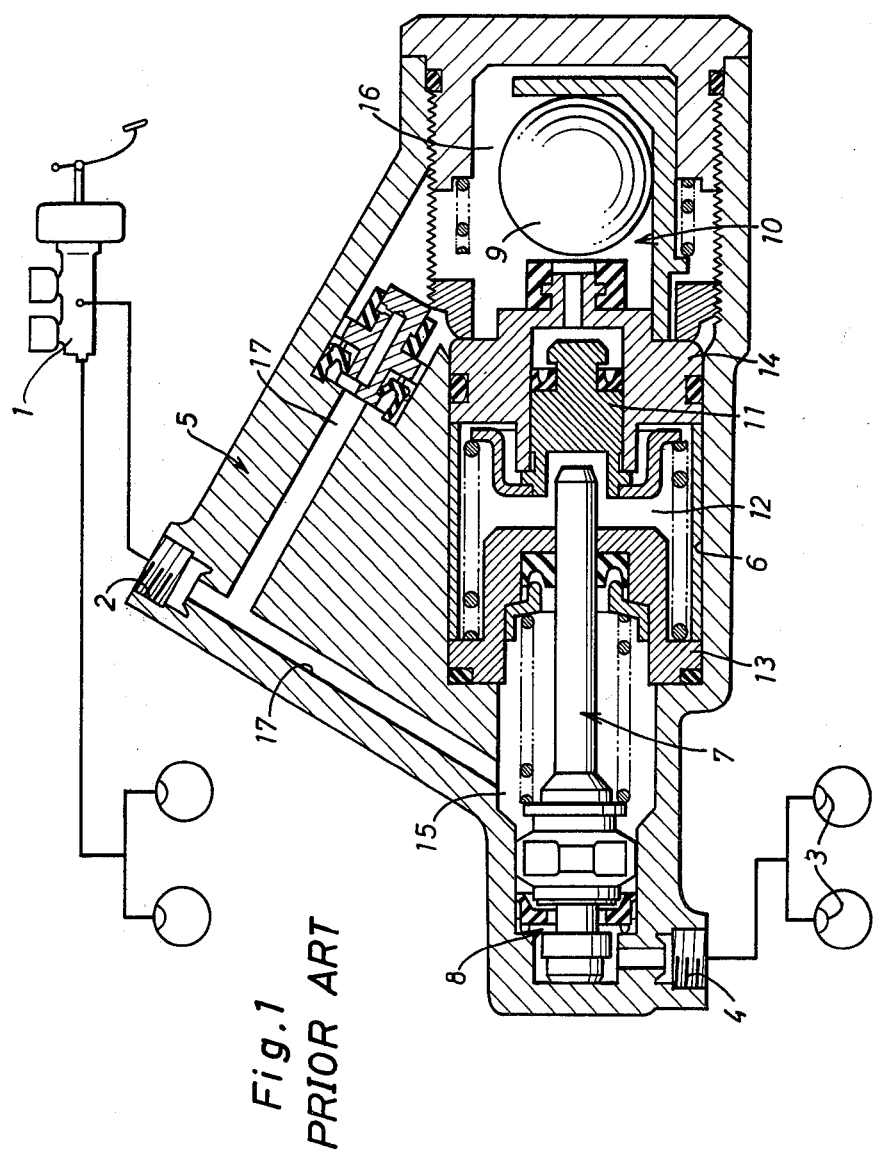
FIG. 1 is a schematic illustration of a vehicle braking system including a conventional fluid pressure control valve unit of the inertia-controlled type.

In FIG. 2 of the drawings, a fluid pressure control valve unit 20 of the inertia-controlled type includes a housing assembly 21 composed of a housing body 23 and a plug 24 threaded into the rear end of housing body 23 through an annular seal member 73 to close a stepped bore 22 of housing body 23. The plug 24 is provided with an inlet port 25 in connection to the rear pressure chamber of a tandem master cylinder 27 by way of a conduit 26. The housing body 23 is provided at the front end portion thereof with an outlet port 28 in connection to rear wheel brake cylinders 30, 30 by way of a conduit 29, the outlet port 28 being shown by dotted lines in the figure. The front pressure chamber of master cylinder 27 is connected to front wheel brake cylinders 31, 31 by way of a conduit 32. The housing assemmbly 21 is adapted to be fixedly mounted at an inclined angle along a fore-and-aft axis on a vehicle body structure.

The housing body 23 is provided at its left end portion with a stepped bore 22a in open communication with the outlet port 28. A stepped piston 33 is slidably disposed within the stepped bore 22a and has a valve part 48 which is cooperable with a valve seat 49 secured to an annular shoulder 51 of stepped bore 22a to provide a control valve 34. Assembled within an intermediate portion of housing body 23 is a support assembly 35 for the stepped piston 33 and a control plunger 37. Assembled also within the right end portion of housing body 23 is an inertia-controlled valve assembly 36. The support assembly 35 includes a first partition member 39 assembled in a fluid-tight manner within the intermediate portion of housing body 23 through a pair of annular seal members 71, 72, and a second partition member 41 threaded within first partition member 39 through an annular seal member 75 to provide a space 42 between partition members 39 and 41. The first partition member 39 is secured in position by abutment with an annular shoulder 43 of stepped bore 22 at its left end and abutment with the inner end of plug 24 to subdivide the interior of housing body 23 into first and second chambers 44 and 45 respectively in open communication with the outlet and inlet ports 28 and 25. The first partition member 39 is formed at its peripheral portion with communication passages 68, 69 and 70 for providing a fluid communication between the first and second chambers 44 and 45 and is further formed at its central portion with an axial bore 38 in which the control plunger 37 is slidably disposed to provide a third chamber 59 opening toward the second chamber 45. The second partition member 41 is provided with an axial bore 40 and an annular seal member 76 through which the right end portion 46 of piston 33 extends into the space 42 between partition members 39 and 41.

In such arrangement as described above, the stepped piston 33 and the control valve 34 are located within the first chamber 44, and the stepped piston 33 is slidably supported from the housing body 23 and the second partition member 41 at its left and right end portions 47 and 46. The central bore of valve seat 49 is in surrounding relationship with a small diameter portion of piston 33 with an annular clearance, and the valve seat 49 is also formed at its inner periphery with a plurality of radial small projections which face the stepped portion of piston 33 to allow fluid flow between the first chamber 44 and the outlet port 28. The stepped piston 33 is in abutment against the inner end wall of housing body 23 under loading of a first coil spring 52 which has a cone-shaped portion in engagement with a land 53 of piston 33 and a cylindrical portion in engagement with the left end of partition member 39. The coil spring 52 acts to bias the stepped piston 33 in the direction toward a normal position in which the control valve 34 is opened to permit fluid flow between the first chamber 44 and the outlet port 28. It is also noted that the effective diameter of valve seat 49 is determined to be larger than that of the right end portion of piston 33.

The inertia-controlled valve assembly 36 includes a ball receiver 54, an inertia-controlled valve element 55 in the form of a metallic ball, and an annular valve seat 57 of elastic material with a central bore 56. The ball receiver 54 is provided at its left end with a projection 61 inserted into partition member 39 and is fixed in place by biasing force of a coil spring 60 received by plug 24. The ball receiver 54 is further provided at its right end wall 62 with holes 63 and an annular protrusion 65 in surrounding relationship with holes 63. A recess 64 is formed in a thick wall portion of receiver 54. The ball 55 contained within the receiver 54 is free to roll forwardly on the inclined bottom of receiver 54. This ball 55 cooperates with the valve seat 57 secured to a tubular boss 58 of partition member 39 to provide a cut-off valve which acts to interrupt fluid communication between the second and third chambers 45 and 59. The ball 55 normally rests under gravity in the position to open the cut-off valve. When the rate of deceleration caused by application of the brakes exceeds a predetermined value, the ball 55 will move into engagement with the valve seat 57 due to the inertia force acting thereon to close the cut-off valve.

The control plunger 37 is formed with an annular flange 67 in engagement with the inner wall of partition member 39 and is loaded toward the third chamber 59 by a second coil spring 66 which is engaged at one end thereof with the inner wall of partition member 41 and at the other end thereof with the flange 67 of plunger 37. Thus, the control plunger 37 is arranged to be brought into engagement with the right end of piston 33 by receiving the pressure in the third chamber 59. In this arrangement, the distance between the left end of plunger 37 and the right end of piston 33 is determined to be larger than the rightward moving stroke of piston 33 necessary for closing the control valve 34.

In operation of the fluid pressure valve unit 20, when tha brake pedal is normally depressed under the unloaded condition of the vehicle to actuate the master cylinder 27, the hydraulic pressure exerted in the front chamber of master cylinder 27 is directly applied to the front wheel brake cylinders 31, 31 through conduit 32, whereas the hydraulic pressure in the rear chamber of master cylinder 27 is applied into the inlet port 25 of valve unit 20 through conduit 26. Within the valve unit 20, the pressurized fluid flows into the rear wheel brake cylinders 30, 30 across the second chamber 45, the communication passages 70, 69, 68, the first chamber 44,, the outlet port 28 and the conduit 29. Thus, the front and rear wheel brake cylinders are actuated to operate the brakes in response to the value of the master cylinder pressure, as shown by a solid line segment a–b in FIG. 3. In this stage, the rate of deceleration acting on the ball 55 increases in value in response to the increase of the master cylinder pressure, but the ball 55 rests in the position. Further, in this stage, the control plunger 37 is urged in the forward direction by the pressure in the third chamber 59 against the resilient force of second spring 66, whereas the stepped piston 33 is urged in the rearward direction by the pressure in the first chamber 44.

When the master cylinder pressure reaches a value to increase the rate of deceleration on the ball 55 to the predetermined value, the ball 55 rolls forwardly and moves into engagement with the valve seat 57 to close the cut-off valve to interrupt fluid communication between the second and third chambers 45 and 59. Then, the pressure in the third chamber 59 is maintained at a constant value, and the resilient force of second spring 66 is maintained at a constant value. In this instance, the pressure in the third chamber 59 will be lower than that under the loaded condition of the vehicle. If the master cylinder pressure is further increased by continued depression of the brake pedal, the stepped piston 33 moves rearwardly by the hydraulic pressure acting on the effective surface area difference of piston 33 and opposing the resilient force of first spring 52 to close the control valve 34. Subsequently, opening and closing operation of the control valve 34 is conducted in accordance with the reciprocation of piston 33 so that the pressure applied to the rear wheel brake cylinders 30, 30 will increase as shown by a solid line segment $b-c$ in FIG. 3. During the above operation, the ball 55 is seated on the valve seat 57 by the inertia thereof and the difference in pressure between the second and third chambers 45 and 59. The control plunger 37 does not abut against the right end of piston 33.

If under the loaded condition of the vehicle the master cylinder pressure reaches a high value to increase the rate of deceleration on the ball 55 to the predetermined value, the pressure in the third chamber 59 will increase higher than that under the unloaded condition of the vehicle. Then, the control plunger 37 will move into abutment with the right end portion 46 of piston 33 against the resilient force of second spring 66. Thus, the stepped piston 33 will be returned to its forward stroke end and held in the position of FIG. 2 to open the control valve 34. For the purpose of controlling the movement of piston 33 in such a manner as described above, the cross-sectional area of plunger 37 is determined to be larger than that of the right end portion 46 of piston 33. In FIG. 3, the solid line segments $a-b-d-e-f$ illustrate control of the pressure applied to the rear wheel brake cylinders 30, 30 under the above operation.

If under the unloaded condition of the vehicle the master cylinder pressure is rapidly increased by emergent depression of the brake pedal, the ball 55 is forced to roll forwardly in response to the rapid increase of pressure in the first chamber 45 and moves into engagement with the valve seat 57 to close the cut-off valve before the rate of deceleration reaches the predetermined value. This serves to maintain the pressure in the third chamber 59 at a low level so as to ensure the pressure controlling characteristics of FIG. 3. In this instance, if the pressure in the third chamber 59 was increased excessively higher than that in the normal braking operation due to flow resistance in the communication passages between the master cylinder 27 and the rear wheel brake cylinders 30, 30, the pressure controlling characteristics would be shifted to that under the load condition of the vehicle.

In FIG. 4, there is illustrated a modification of the above embodiment in which the first coil spring 52 is replaced with a coil spring 152 interposed between the stepped piston 33 and the control plunger 37. In such modification, the second coil spring 66 is in surrounding relationship with the coil spring 152, and both the piston 33 and plunger 37 do not abut to each other due to intervention of the coil spring 152. With this arrangement, the coil spring 152 acts to permit the rearward movement of piston 33 in operation under the loaded condition of the vehicle thereby to ensure such pressure controlling characteristics as shown by solid line segments $a'-b'-c'$ and $a'-b'-d'-e'-g-f'$ in FIG. 5.

Figure 6:
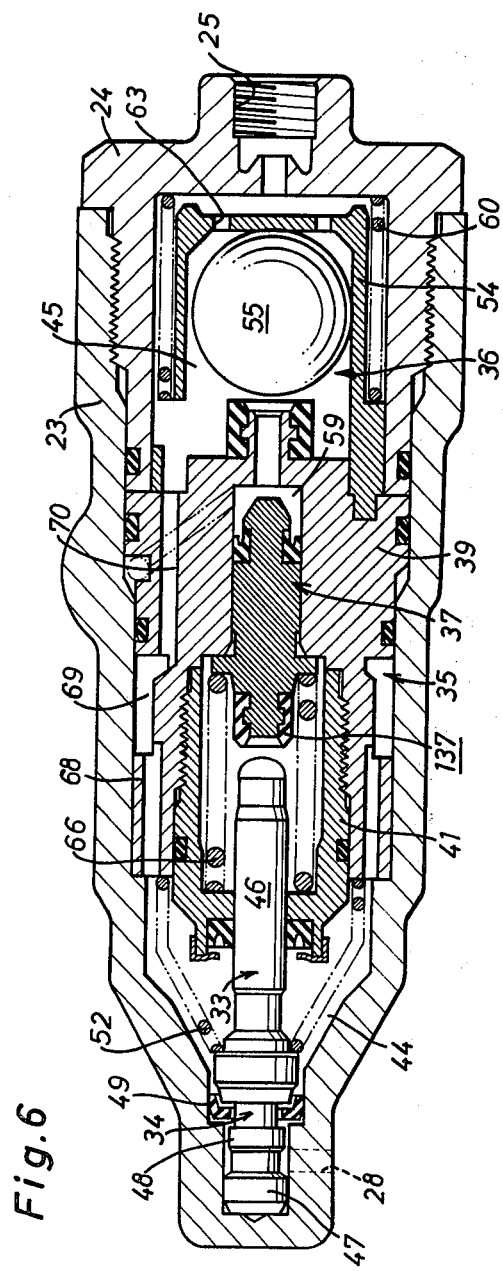
FIG. 6 illustrates another modification of the valve unit shown in FIG. 2.
Figure 7:
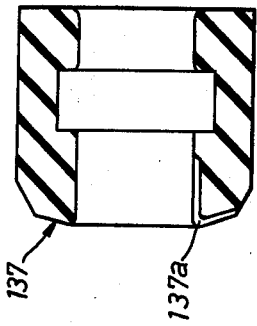
FIG. 7 is an enlarged sectional view of a cushioning member shown in FIG. 6.
Figure 8:
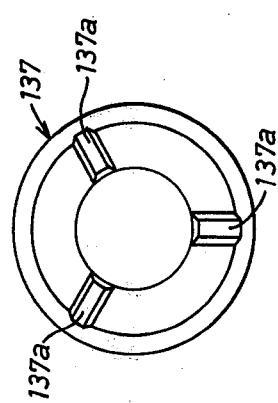
FIG. 8 is an enlarged front view of the cushioning member of FIG. 7.

Another modification of the above embodiment is disclosed in reference with FIG. 6, in which a cushioning member 137 of such an elastic material as rubber is secured to the left end of plunger 37 confronting the right end of piston 33 to eliminate unpleasant noises caused by abutment of the control plunger 37 against the right end of piston 33. As shown in FIGS. 7 and 8, the cushioning member 137 is formed at its end face with a plurality of equiangularly spaced radial grooves 137a which act to prevent the cushioning member 137 from stick to the right end of piston 33 and to enhance the flexibility of cushioning member 137. All other constructions remain unchanged with the same reference numerals for the same component parts and portions.

Figure 9:
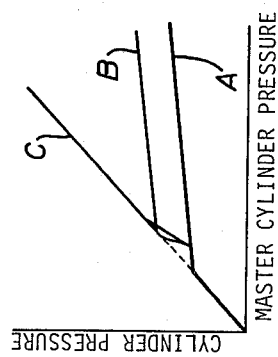
FIG. 9 is a graph showing the pressure controlling characteristics of the modification shown in FIG. 6.

In such modification described above, when the master cylinder pressure reaches a value to increase the rate of deceleration to the predetermined value under the unloaded condition of the vehicle, the ball 55 rolls forwardly and moves into engagement with the valve seat 57 to interrupt fluid communication between the second and third chambers 45 and 59. In response to further increase of the master cylinder pressure, the stepped piston 33 moves rearwardly by the hydraulic pressure acting on the effective surface area difference of piston 33 and opposing the resilient force of first spring 52 to close the control valve 34. Subsequently, opening and closing operation of the control valve 34 is conducted in accordance with the reciprocation of piston 33 so that the pressure applied to the rear wheel brake cylinders 30, 30 will increase as shown by a solid line A in FIG. 9. During such operation, the control plunger 37 does not abut against the right end of piston 33 because the pressure in the third chamber 59 is maintained at a low level.

If under the loaded condition of the vehicle the master cylinder pressure reaches a high valve to increase the rate of deceleration to the predetermined value, the pressure in the third chamber 59 will increase to cause abutment of the control plunger 37 against the right end of piston 33 through the cushioning member 137. Thus, the cushioning member 137 is compressed to return the stepped piston 33 to its forward stroke end so as to open the control valve 34. This results in such a pressure controlling characteristics as shown by a solid line C in FIG. 9.

If the master cylinder pressure is rapidly increased by emergent depression of the brake pedal under the unloaded condition of the vehicle, the pressure in the third chamber 59 will increase to slightly deform the cushioning member 137 by abutment against the right end of stepped piston 33. Thus, the flexibility of cushioning member 137 serves to permit the rearward movement of piston 33 so as to conduct opening and closing operation of the control valve 34. This results in such a pressure controlling characteristics as shown by a solid line B in FIG. 9.

In the actual practices of the above embodiment and modifications, it is noted that the second partition member 41 may be fixed in place within the housing body 23 to couple the first partition member 39 therein and that the cushioning member 137 may be secured to the right end of piston 33 to be brought into abutment with the left end of control plunger 37.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A fluid pressure control valve unit for incorporation between a master cylinder and a wheel brake cylinder in a vehicle braking system, comprising:

a housing adapted to be fixedly mounted at an inclined angle on a vehicle body structure, said housing being provided at opposite ends thereof with an inlet port for connection to said master cylinder and an outlet port for connection to said wheel brake cylinder and provided therein with a stepped bore in open communication with said outlet port at its small diameter portion;

a first partition member secured in position within said housing to provide first and second chambers respectively in open communication with said outlet port and said inlet port, said first partition member being formed at its peripheral portion with a communication passage for providing a fluid communication between said first and second chambers and being formed with an axial bore opening toward said second chamber;

a second partition member fixedly coupled in a fluid-tight manner with said first partition member to provide a space between said first and second partition members;

a stepped piston slidably disposed within said stepped bore of said housing in said first chamber and extending at one end thereof through said second partition member into said space;

valve means cooperable with said stepped piston for controlling intercommunication between said first chamber and said outlet port in dependence upon axial movement of said stepped piston;

a first spring for biasing said piston in the direction toward a position in which said valve means is opened to permit fluid flow between said first chamber and said outlet port;

a control plunger slidably disposed within said axial bore of said first partition member to provide a third chamber in open communication with said second chamber, said control plunger being arranged to be brought into abutment at its one end with the extending end of said piston;

an inertia-controlled valve assembly including a valve seat provided on said first partition member to permit fluid flow into said third chamber from said second chamber, and an inertia-controlled valve element disposed within said second chamber for normally permitting fluid flow between said second and third chambers but adapted to cooperate with said valve seat to cut-off the fluid communication when said valve element is subjected to a deceleration in excess of a predetermined value; and a second spring disposed within said space for biasing said control plunger toward said third chamber.

2. A fluid pressure control valve unit as set forth in claim 1, wherein said first spring is in the form of a coil spring disposed within said first chamber and engaged at one end thereof with said stepped piston and at the other end thereof with said first partition member.

3. A fluid pressure control valve unit as set forth in claim 1, wherein said first spring is in the form of a coil spring disposed within said space between said partition members and interposed between said stepped piston and said control plunger, and wherein said second spring is in the form of a coil spring engaged at one end thereof with said control plunger and at the other end thereof with said second partition member and being in surrounding relationship with said first coil spring.

4. A fluid pressure control valve unit as set forth in claim 1, 2 or 3, wherein a cushioning member of elastic material is secured to one of the confronting ends of said stepped piston and said control plunger and arranged to be brought into abutment with the other of the confronting ends of said stepped piston and said control plunger.

5. A fluid pressure control valve unit as set forth in claim 1, 2 or 3, wherein said stepped piston, said springs, said control plunger and said inertia-controlled valve assembly are arranged on a common axis in said housing.

6. A fluid pressure control valve unit as set forth in claim 1, 2 or 3, wherein said inertia-controlled valve assembly includes a ball receiver fixed in place within said second chamber and provided with a through hole for permitting fluid flow from said inlet port into said second chamber therethrough, and wherein said inertia-controlled valve element is in the form of a ball free to roll toward said valve seat within said ball receiver.

* * * * *